United States Patent [19]

Watanabe et al.

[11] 4,406,981

[45] Sep. 27, 1983

[54] ROTATION STOPPING APPARATUS FOR A MOTOR

[75] Inventors: Yasuaki Watanabe, Kasukabe; Yukio Okabe, Noda, both of Japan

[73] Assignee: Victor Company of Japan, Ltd., Yokohama, Japan

[21] Appl. No.: 318,879

[22] Filed: Nov. 6, 1981

[30] Foreign Application Priority Data

Nov. 4, 1980 [JP] Japan ............................... 55/154876
Nov. 4, 1980 [JP] Japan ............................... 55/154877
Nov. 5, 1980 [JP] Japan ............................... 55/155598

[51] Int. Cl.³ .......................................... H02P 3/10
[52] U.S. Cl. .................................... 318/258; 318/318
[58] Field of Search ................. 318/254, 254 A, 301, 318/302, 311, 314, 318, 329, 345 A, 363, 373, 744

[56] References Cited

U.S. PATENT DOCUMENTS

| 3,255,399 | 6/1966 | Parks | 321/8 |
| 3,833,821 | 9/1974 | Weaver | 307/150 |
| 4,058,094 | 11/1977 | Moore | 318/318 |
| 4,127,799 | 11/1978 | Nakamura et al. | 318/254 A |
| 4,284,931 | 8/1981 | Ehret | 318/318 |
| 4,286,199 | 8/1981 | Nagakubo et al. | 318/318 |

FOREIGN PATENT DOCUMENTS 1561741  8/1976  United Kingdom .

Primary Examiner—J. V. Truhe
Assistant Examiner—A. Evans
Attorney, Agent, or Firm—Louis Bernat

[57] ABSTRACT

A rotation stopping apparatus for a motor comprises a frequency signal generating circuit for generating a signal having a frequency according to a rotational speed of a motor, a voltage forming circuit for forming a voltage according to the frequency of the frequency signal from the frequency signal generating circuit, a motor driving circuit for supplying a forward direction current to the motor upon rotation of the motor and supplying a reverse direction current to the motor when the rotation of the motor is stopped to perform a damping operation with respect to the rotation of the motor, a detecting circuit for detecting that a voltage from the voltage forming circuit has become below a predetermined threshold voltage, and an interrupting circuit for interrupting the supply of the reverse direction current to the motor by the motor driving circuit according to the detected result obtained from the detecting circuit.

11 Claims, 8 Drawing Figures

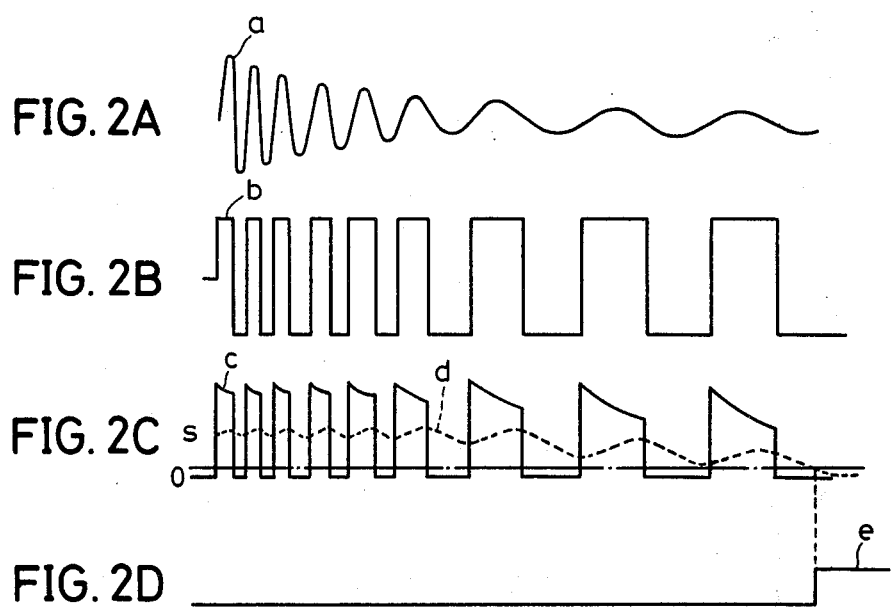
FIG. 2A
FIG. 2B
FIG. 2C
FIG. 2D
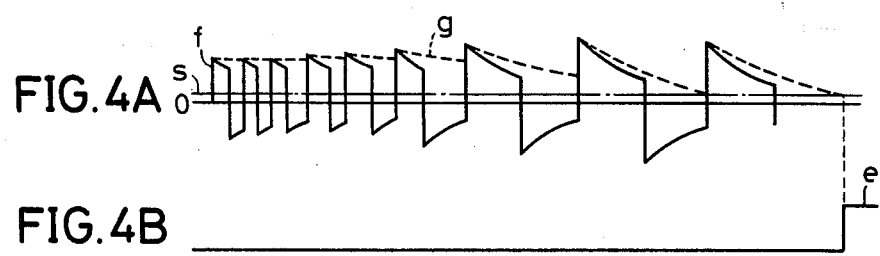
FIG. 4A
FIG. 4B

ROTATION STOPPING APPARATUS FOR A MOTOR

BACKGROUND OF THE INVENTION

The present invention generally relates to rotation stopping apparatuses for motors, and more particularly to an apparatus stopping rotation of a motor with high accuracy and maintaining the motor in a stopped state by use of a simple rotation stoppage detection circuit.

Generally, a motor (Hall motor) using a Hall element is capable of rotating towards forward and reverse directions. In order to stop a rotor rotating in the forward direction, a torque (reverse torque) in the reverse direction is applied to the rotor. However, when the reverse torque is applied to the rotor to stop the rotation of the rotor, although the rotational speed of the rotor is reduced instantaneously reduced to zero, the rotor will start to rotate in the reverse direction thereafter if the reverse torque is continued to be applied to the rotor. Accordingly, in order to perfectly stop the rotation of the rotor, it is necessary to detect the stoppage of rotation of the rotor and stop the reverse torque from being applied to the rotor.

Hence, various detection circuits for detecting the stoppage of rotation of the rotor, have conventionally been proposed. As an example of a conventional rotation stoppage detection circuit, there was a circuit in which it is detected that the rotational speed of the rotor has become substantially one-tenth of the rotational speed upon constant rotation by use of a voltage comparator, to pass the detected output through a delay circuit, and use the delayed output as a rotation stoppage detection signal to stop the application of the reverse torque with respect to the rotor. In this case, the time it takes for the rotational speed of the above rotor to reach zero from the rotational speed which is substantially one-tenth that upon constant rotation is measured and estimated in advance, and the delay time of the above delay circuit is set to the above estimated time.

However, in the above conventional circuit, the stoppage of rotation of the rotor is not directly detected, and the rotation stoppage signal is produced at the point in time which has been preset by the delay circuit. Hence, there was a disadvantage in that the operation to stop the rotation of the rotor could not be performed with high accuracy. Moreover, there was a disadvantage in that the circuit construction became complex, since the circuit used a voltage comparator, a delay circuit, and the like.

On the other hand, as another conventional circuit, there was a circuit in which the rotational speed of the rotor is counted by a digital counter, and it is detected that the rotational speed of the rotor has become equal to or below a predetermined value, to cut off the power source with respect to a motor driving circuit. However, the circuit construction of this conventional circuit is complex since digital circuits such as a digital counter are used, and there was a disadvantage in that the circuit could not be constructed at low cost.

Furthermore, in the conventional motor driving circuit, even when the application of the reverse torque with respect to the rotor is stopped, in a case where the rotor receives an external force urging rotation in the reverse direction due to some cause, a torque in the reverse direction is applied to the motor. In this case, the motor unnecessarily starts to rotate in the reverse direction.

SUMMARY OF THE INVENTION

Accordingly, it is a general object of the present invention to provide a rotation stopping apparatus for a motor in which the above described disadvantages have been overcome.

Another and more specific object of the present invention is to provide a rotation stopping apparatus for a motor, in which the stoppage of rotation of a rotor in a Hall motor is positively detected by use of a simple circuit construction, to maintain the Hall motor in a rotationally stopped state.

Still another object of the present invention is to provide a rotation stopping apparatus for a motor, constructed so that even when the rotor is rotated in the reverse direction in a case where the rotor is in a rotationally stopped state due to some external disturbance, a reverse torque is prevented from being applied to the rotor, and the motor is prevented from rotating in the reverse direction.

Other objects and further features of the present invention will be apparent from the following detailed description when read in conjunction with the accompanying drawings.

BRIEF DESCRIPTION OF THE DRAWINGS

FIGS. 2A through 2D are diagrams respectively showing signal waveforms for explaining the operation of the circuit system shown in FIG. 1;

FIGS. 4A and 4B are diagrams respectively showing signal waveforms for explaining the embodiment shown in FIG. 3.

DETAILED DESCRIPTION

Figure 1:
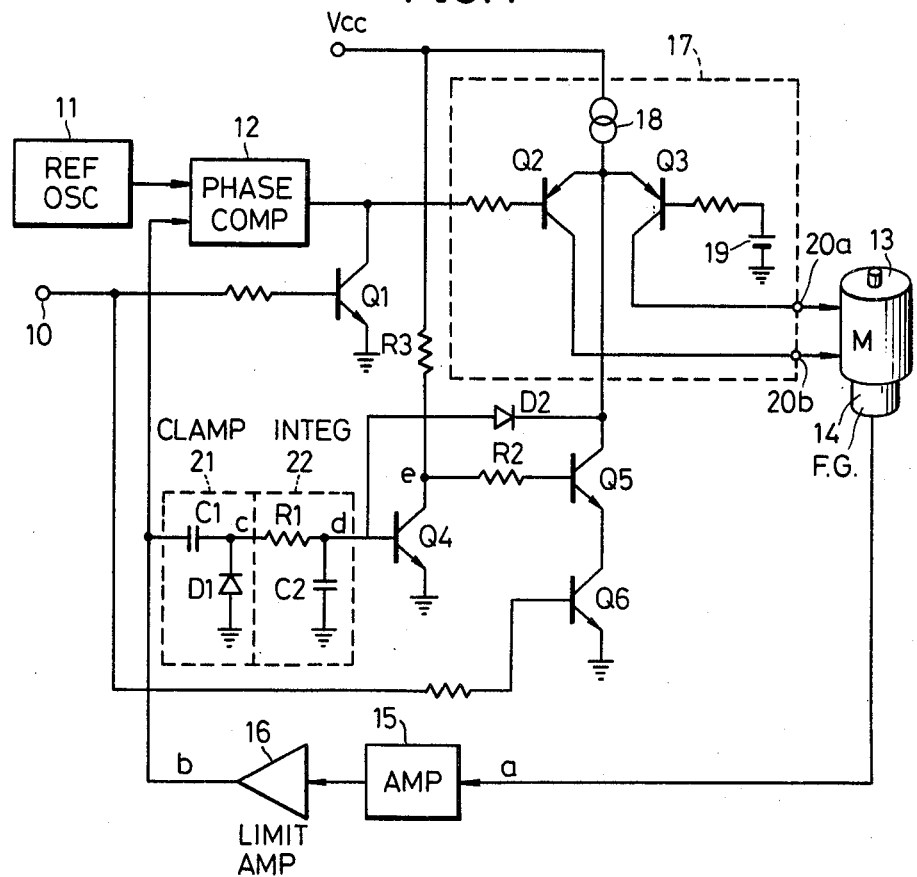
FIG. 1 is a systematic circuit diagram showing a first embodiment of a rotation stopping apparatus for a motor according to the present invention.

Description will be given with respect to a first embodiment of a rotation stopping apparatus for a motor according to the present invention, by referring to FIG. 1.

First, when starting rotation in a forward direction, a low-level (L-level) signal is applied to a terminal 10. Hence, a transistor Q1 having a base connected to the terminal 10 is in a non-conducting (OFF) state. On the other hand, a reference frequency signal produced from a reference oscillator 11 is supplied to a phase comparator 12. However, since a Hall motor 13 is not rotating, no output is produced from a frequency generator 14 which generates a rotational frequency signal as a rotor of the Hall motor 13 is rotated. Accordingly, no output is produced and supplied from a limiting amplifier 16 to the phase comparator 12. Therefore, a large error output is obtained from the phase comparator 12, and this error output is applied to a base of a transistor Q2 within a motor driving circuit 17.

The above motor driving circuit consists of PNP transistors Q2 and Q3 having emitters connected in common, a constant current source 18 connected to the emitters of the transistors Q2 and Q3, and a constant voltage source 19 connected to a base of the transistor Q3. The transistor Q2 is put into an OFF state by the above large error output, while the transistor Q3 is accordingly put into a conductive (ON) state. Thus, a current for forward rotation is supplied to the motor 13 through the transistor Q3 and a terminal 20a, and the rotor of the motor 13 is rotated towards the forward direction.

Moreover, upon starting of the motor 13, no output is produced from the limiting amplifier 16. Hence, a transistor Q4 is in an OFF state, and a transistor Q5 is in an ON state. However, a L-level signal is applied to a base of a transistor Q6 through the terminal 10, and puts the transistor Q6 in an OFF state.

Upon constant rotation, the rotational frequency signal obtained from the frequency generator 14 as the rotor of the motor 13 is rotated, is supplied to the limiting amplifier 16 through an amplifier 15. A waveform shaping operation is performed with respect to the rotational frequency signal at the limiting amplifier 16. The output of the limiting amplifier 16 is supplied to the phase comparator 12 on one hand, wherein the phase of the output from the limiting amplifier 16 is compared with the phase of the reference frequency signal obtained from the reference oscillator 11. An error output signal obtained as a result of the above comparison of phases, is supplied to the motor driving circuit 17. Accordingly, the motor 13 is controlled by the motor driving circuit 17 so as to rotate at a constant speed according to the above reference frequency signal.

On the other hand, the output of the limiting amplifier 16 is applied to a base of the transistor Q4 through a clamping circuit 21 consisting of a capacitor C1 and a diode D1, and an integrating circuit 22 consisting of a resistor R1 and a capacitor C2. An emitter of the transistor Q4 is grounded, while a collector thereof is connected to a base of the transistor Q5 through a resistor R2 and also to a terminal of a power source Vcc through a resistor R3. An emitter of the transistor Q5 is connected to a collector of the transistor Q6, and an emitter of the transistor Q6 is grounded. Moreover, a collector of the transistor Q5 is connected to the constant current source 18 and to the emitters of the transistors Q2 and Q3. Furthermore, a diode D2 is connected between the base of the transistor Q4 and the collector of the transistor Q5.

Upon normal constant speed rotation of the motor 13, a signal having a relatively high frequency is obtained from the frequency generator 14. Hence, a voltage which is higher than the threshold voltage of the transistor Q4 is applied to the base of the transistor Q4. The transistor Q4 is thus in an ON state, and the transistor Q2 is in an OFF state. Therefore, a current does not flow towards the transistor Q5 from the constant current source 18, and the current for rotating the motor 13 towards the forward direction is continued to be supplied to the motor 13 through the terminal 20a.

Next, when the rotation of the motor 13 is stopped, a high-level(H-level) signal is applied to the terminal 10. Hence, the transistor Q2 is put into an ON state, and the output side of the phase comparator 12 becomes grounded. In addition, the base of the transistor Q2 within the motor driving circuit 17 becomes of low level, and the transistor Q2 is put into an ON state. Hence, the transistor Q3 becomes OFF, and a current for rotating the motor 13 towards the reverse direction is supplied to the motor 13 from the constant current source 18, through the transistor Q2 and a terminal 20b. Therefore, the rotor of the motor 13 which was undergoing constant rotation in the forward direction until that point in time receives a torque in the reverse direction. The above torque in the reverse direction acts as a braking force, and the rotational speed of the rotor is gradually reduced.

As the rotational speed of the rotor of the motor 13 is reduced, the frequency of an output a of the frequency oscillator 11 decreases as indicated in FIG. 2A. The above output a is amplified at the amplifier 15, and then subjected to waveform shaping at the limiter amplifier 16. Thus, as indicated in FIG. 2B, a square wave b having a frequency which varies according to the frequency variation in the output a is obtained from the limiting amplifier 16.

The above output square wave b is supplied to the phase comparator 12 and also to the clamping circuit 21. Hence, the square wave b is clamped at zero level by the diode D1 of the clamping circuit 21, and converted into a signal c having a waveform indicated by a solid line in FIG. 2C. Moreover, the peak parts of the above waveform are shaped as shown in FIG. 2C due to the effect introduced by the charging and discharging of the capacitor C1 within the clamping circuit 21. The signal c thus obtained, is integrated at the integrating circuit 22, and converted into a voltage d having a waveform indicated by a dotted line in FIG. 2C. As clearly seen from FIG. 2C, the terminal voltage d of the capacitor C2 within the integrating circuit 22 decreases as the frequency of the signal c decreases.

When the above voltage d becomes lower than a threshold voltage s of the transistor Q4, the transistor Q4 is accordingly put into an OFF state. Since the transistor Q4 becomes OFF, the voltage at the collector side of the transistor Q4 becomes of high level as indicated in FIG. 2D and the transistor Q5 becomes ON. The H-level signal applied to the terminal 10 during the above mode in which the rotation of the motor is stopped is applied to the base of the transistor Q6, and the transistor Q6 is ON. Accordingly, when the transistor Q5 becomes ON as described above, the current from the constant current source 18 all flow towards the ground side through the transistor Q5 and the transistor Q6 which is already in an ON state. Hence, the current for rotating the motor in the reverse direction is no longer supplied to the motor 13 from the constant current source 18. Therefore, the torque in the reverse direction is not generated, the rotor stops rotating, and the motor 13 is maintained in the stopped state without starting rotation in the reverse direction.

In a case where the application of the current for rotating the motor in the reverse direction is not stopped, the rotational speed of the rotor in the forward direction is reduced and instantly becomes zero, and then, the rotor starts to rotate towards the reverse direction. In this state, the frequency of the output from the frequency generator 14 gradually decreases and again increases after being decreased to a minimum value near zero. Thus, the integrating time constant of the resistor R1 and the capacitor C2 within the integrating circuit 22 is set, so that the transistor Q4 becomes OFF at the point in time when the frequency of the output from the frequency generator 14 becomes minimum. Accordingly, the instant when the rotor of the motor 13 stops rotating can be detected accurately, to interrupt the current for rotating the motor in the reverse direction.

An example of the circuit constants in the above embodiment of the invention is as follows.
CAPACITOR C1 = 1 μF, C2 = 10 μF
RESISTOR R1 = 10 kΩ

A case is assumed in which the rotor of the motor 13 is rotated towards the reverse direction due to some mechanical external disturbance. According to the present embodiment of the invention, an output is produced from the frequency generator 14, and a certain voltage is obtained at the output of the integrating circuit 22. However, the transistor Q6 is ON when the rotation of the motor 13 is stopped, and further, the transistors Q4 and Q5 respectively are in ON and OFF states. Hence, the base of the transistor Q4 is grounded through the transistors Q5 and Q6 which are in ON states, and further through the diode D2 connected between the base of the transistor Q4 and the collector of the transistor Q5. Therefore, the output side of the integrating circuit 22 is substantially grounded, and the transistor Q1 does not become ON even when an output is introduced at the frequency generator 14.

Thus, according to the present embodiment of the invention, even when the rotor is rotated towards the reverse direction due to some external disturbance, no inconveniences are introduced in which the transistors Q4 and Q5 respectively become ON and OFF and the current for rotating the motor in the reverse direction flows to the motor 13 through the transistor Q2. Therefore, the motor 13 can be positively maintained in the rotationally stopped state.

In order to perform the above operation with more positiveness, a germanium diode having a small conducting voltage is preferably used for the diode D2. It is also desirable to use a silicon transistor having a large base-emitter voltage for the transistor Q4. Further, a Schmitt amplifier may be used instead of the limiting amplifier 16.

Figure 3:
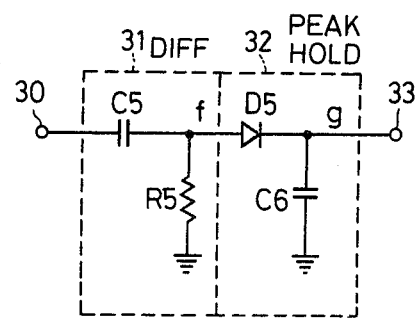
FIG. 3 is a circuit diagram showing an essential part of a second embodiment of a rotation stopping apparatus for a motor according to the present invention.

Next, description will be given with respect to a circuit which is a part of a second embodiment of a rotation stopping apparatus for a motor according to the present invention. In this second embodiment of the invention, a differentiating circuit 31 and a peak holding circuit 32 shown in FIG. 3 are used instead of the clamping circuit 21 and the integrating circuit 22 used in the above first embodiment of the invention. The circuit construction of the second embodiment of the apparatus according to the present invention is identical to that of the first embodiment of the invention except for the above differentiating circuit 31 and the peak holding circuit 32, and thus, the illustration and description with respect to the remaining parts of the apparatus will be omitted.

The square wave b indicated in FIG. 2B obtained from the limiting amplifier 16 is supplied to the phase comparator 12, and also supplied to the differentiating circuit 31 consisting of a capacitor C5 and a resistor R5 through a terminal 30. Hence, the square wave b is differentiated and converted into a signal f indicated by a solid line in FIG. 4A by the above differentiating circuit 31. The peaks of the signal f are held by the peak holding circuit 32 consisting of a diode D5 and a capacitor C6, and converted into a signal g having a waveform indicated by a dotted line in FIG. 4A. As the output frequency of the frequency generator 14 decreases, the minimum value of the signal g becomes smaller. The above signal g is applied to the case of the transistor Q4 through a terminal 33. When the voltage of the signal g becomes lower than the threshold voltage s of the transistor Q4, the transistor Q4 becomes ON. Thus, a collector voltage e of the transistor Q4 becomes of high level as indicated in FIG. 4B at the point in time when the signal g becomes lower than the threshold voltage s of the transistor Q4.

The circuit operation thereafter, and other operations of the circuit, are the same as in the above described first embodiment of the invention, and description thereof will be omitted.

In addition, in each of the above described embodiments of the invention, the motor 13 is used for rotating a disc recorded with an information signal, for example.

Further, the present invention is not limited to these embodiments, but various variations and modifications may be made without departing from the scope of the present invention.

What is claimed is:

1. Apparatus for stopping the rotation of a motor, said apparatus comprising:
    a single signal generating means responsive to said motor for generating a signal having a frequency which varies according to the speed of said motor;
    means responsive to said signal generating means for forming a voltage having a level corresponding to the frequency of said signal;
    motor driving means responsive to said voltage for normally driving said motor with current of one polarity to operate said motor in a forward direction during a normal run and for driving said motor with current of an opposite polarity to stop said motor;
    detector means responsive to said voltage for indicating when said voltage falls below a threshold level; and
    interrupting means responsive to said detector means for terminating said current of opposite polarity when said voltage falls below said threshold level.

2. The apparatus of claim 1 wherein said voltage forming means comprises wave shaping means responsive to said signal for shaping said signal into a square wave, clamping circuit means for limiting upper and lower sides of said square wave to predetermined voltage levels, and averaging means responsive to said clamping circuit means for giving a voltage output having a level representing the average value of the output of said clamping circuit.

3. The apparatus of claim 2 wherein said wave shaping means comprises a limiting amplifier, said clamping circuit means comprises a first capacitor and a first diode for limiting the lower side of said square wave at one of said predetermined levels, and said averaging means comprises an integrating circuit having a first resistor and a second capacitor.

4. The apparatus of claim 1 wherein said wave shaping means comprises means for differentiating said square wave, and means responsive to said differentiating means for holding the peak value of said differentiated square wave for a predetermined period of time.

5. The apparatus of claim 1 wherein said motor driving means comprises a current source, a first transistor coupled to switch ON responsive to a rotation of said motor, means for supplying said current of said one polarity from said current source through said first transistor to said motor, a second transistor coupled to switch ON responsive to a stopping of said motor, means for supplying said current of said opposite polarity from said current source through said second transistor to said motor, means for switching OFF said first transistor responsive to a stopping of said motor, and means for switching OFF said second transistor responsive to rotation of said motor.

6. An apparatus as claimed in claim 1 in which said motor is a Hall motor having a Hall element.

7. An apparatus as claimed in claim 4 in which said differentiating means is a differentiating circuit consisting of a third capacitor and a second resistor, and said holding means is a peak holding circuit consisting of a second diode and a fourth capacitor.

8. An apparatus as claimed in claim 1 in which said detector means consists of a third transistor having a base connected to said voltage forming means, and said third transistor is turned ON when the base voltage becomes greater than a predetermined threshold voltage and turned OFF when the base voltage becomes smaller than the predetermined threshold voltage.

9. An apparatus as claimed in claim 1 in which said motor driving circuit has a current source, and said interrupting means has a grounding circuit, connected to said current source, for grounding said current source according to the detected result obtained from said detecting means.

10. An apparatus as claimed in claim 9 in which said detector means consists of a third transistor having a base connected to said voltage forming means, said third transistor is turned ON when the base voltage becomes greater than a predetermined threshold voltage and turned OFF when the base voltage becomes smaller than the predetermined threshold voltage, and said grounding circuit consists of a fourth transistor having a collector connected to said current source and a base connected to a collector of said third transistor, for grounding said current source when said third transistor becomes OFF by turning ON, and a diode connected between the base of said third transistor and the collector of said fourth transistor.

11. An apparatus as claimed in claim 10 in which said interrupting means further has a fifth transistor connected between an emitter of said fourth transistor and ground, and turned OFF upon rotation of said motor and turned ON upon stoppage of rotation of said motor.

* * * * *